(12) United States Patent
Ruef et al.

(10) Patent No.: US 8,352,435 B1
(45) Date of Patent: Jan. 8, 2013

(54) CONTINUOUS DATA REDUCTION FOR HIGHLY AVAILABLE SYNCHRONOUS MIRRORS

(75) Inventors: Richard P. Ruef, Santa Cruz, CA (US); Uday K. Gupta, Westford, MA (US); Chris D. Youngworth, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 5 days.

(21) Appl. No.: 13/050,905

(22) Filed: Mar. 17, 2011

(51) Int. Cl.
*G06F 7/00* (2006.01)

(52) U.S. Cl. ......... 707/655; 365/201; 711/112; 711/117

(58) Field of Classification Search ................... 707/655
See application file for complete search history.

(56) References Cited

U.S. PATENT DOCUMENTS

| | | | |
|---|---|---|---|
| 5,901,327 A | 5/1999 | Ofek | |
| 6,275,953 B1 | 8/2001 | Vahalia et al. | |
| 6,298,386 B1 | 10/2001 | Vahalia et al. | |
| 6,385,762 B1 | 5/2002 | Lahiri et al. | |
| 6,625,750 B1 | 9/2003 | Duso et al. | |
| 6,718,347 B1 | 4/2004 | Wilson | |
| 6,871,295 B2 * | 3/2005 | Ulrich et al. | 714/6.12 |
| 7,240,238 B2 | 7/2007 | Yanai et al. | |
| 7,383,407 B1 * | 6/2008 | Kiselev | 711/162 |
| 7,383,463 B2 | 6/2008 | Hayden et al. | |
| 7,500,246 B2 | 3/2009 | Saake et al. | |
| 7,546,364 B2 | 6/2009 | Raman et al. | |
| 7,562,250 B2 | 7/2009 | Wahl et al. | |
| 7,620,766 B1 | 11/2009 | Waldspurger | |
| 7,631,155 B1 | 12/2009 | Bono et al. | |
| 7,647,460 B1 | 1/2010 | Wilson et al. | |
| 7,673,099 B1 | 3/2010 | Beaverson et al. | |
| 7,676,514 B2 | 3/2010 | Faibish et al. | |
| 7,720,892 B1 | 5/2010 | Healey, Jr. et al. | |
| 7,725,704 B1 | 5/2010 | Beaverson et al. | |
| 7,822,939 B1 | 10/2010 | Veprinsky et al. | |
| 7,925,850 B1 | 4/2011 | Waldspurger et al. | |
| 2007/0016754 A1 * | 1/2007 | Testardi | 711/206 |
| 2007/0208788 A1 | 9/2007 | Chakravarty et al. | |
| 2007/0220059 A1 * | 9/2007 | Lu et al. | 707/200 |
| 2007/0226444 A1 | 9/2007 | Yagawa | |
| 2008/0005141 A1 | 1/2008 | Zheng et al. | |

* cited by examiner

*Primary Examiner* — Shyue Jiunn Hwa
(74) *Attorney, Agent, or Firm* — Richard Auchterlonie; Novak Druce & Quigg, LLP

(57) ABSTRACT

In a synchronous remote mirroring system, as a host computer writes data to primary storage in a primary data storage system, remote copy data is transferred from the primary data storage system to a secondary storage system in which secondary storage is maintained as a remote mirror of the primary storage. The primary data storage system performs data reduction upon the remote copy data prior to transmitting the remote copy data in a reduced to the secondary data storage system. The secondary data storage system returns an acknowledgement of receipt of the remote copy data upon receipt of the remote copy data in the reduced form, and later reverses the data reduction upon the remote copy data in the reduced form to produce data written to the secondary storage to maintain the secondary storage as the remote mirror of the primary storage.

10 Claims, 6 Drawing Sheets

CONTINUOUS DATA REDUCTION FOR HIGHLY AVAILABLE SYNCHRONOUS MIRRORS

FIELD OF THE INVENTION

The present invention relates generally to remote data mirroring in a data processing network. The present invention specifically relates to synchronous remote data mirroring in which data reduction occurs upon the data that is mirrored to a remote location.

BACKGROUND OF THE INVENTION

Nearly all data processing system users are concerned with maintaining back-up data in order to insure continued data processing operations should their data become lost, damaged, or otherwise unavailable.

Many users of data processing systems require continuous availability to stored data during a major disaster that may cause stored data at a single site to become unavailable. For example, banks, insurance companies, and stock market traders take tremendous steps to insure back up data availability in case of a major disaster.

Remote data mirroring is a way of performing data processing operations upon a primary copy of data while continuously updating a secondary copy at a location remote from the primary copy. If the primary copy becomes lost, damaged, or otherwise unavailable, then data processing may continue by accessing the secondary copy at the remote location. Various modes of synchronization can be employed to select a trade-off between the processing delay in updating the secondary copy during normal operation and the processing delay in switching access over to the secondary copy when the primary copy becomes lost, damaged, or otherwise unavailable. See, for example, Yanai et al. U.S. Pat. No. 7,240,238 issued Jul. 3, 2007, incorporated herein by reference.

If it is desired to switch over read-write access from the primary copy to the secondary copy with virtually no disruption of data processing operations, then remote data mirroring is selected to use a synchronous mode of remote data mirroring. The synchronous mode of operation ensures that when a host computer receives an acknowledgement of completion of a transaction of read-write operations upon the primary copy, the transaction of read-write operations will most certainly be performed upon the secondary copy as well. If the host computer finds that the primary copy becomes unavailable, then host computer can switch read-write access over to the secondary copy and resume read-write access (by re-doing the interrupted transaction) without any further recovery operations.

The synchronous mode of remote data mirroring becomes more demanding with increased distance to the remote secondary copy. There is an inherent delay in transmitting an update to the remote secondary copy and receiving back an acknowledgement of receipt. Therefore in the ideal case it is desired to have a dedicated data link to the remote secondary copy, and in the ideal case it is desired for the dedicated data link to have sufficient bandwidth to carry updates from peak loading of read-write operations from the host computer. In practice, a dedicated data link is relatively costly in comparison to alternatives such as the Internet or on-demand access to additional lines in a public telephone network. Therefore various methods have been used for mitigating delay or disruption due to peak loads and intermittent availability of transmission bandwidth to the remote secondary copy. See, for example, Wilson et al. U.S. Pat. No. 7,647,460 issued Jan. 12, 2010, incorporated herein by reference, and Wahl et al. U.S. Pat. No. 7,562,250 issued Jul. 14, 2009, incorporated herein by reference.

SUMMARY OF THE INVENTION

In accordance with one aspect, the present invention provides a method of remote mirroring of data between a first data storage system and a second data storage system. The second data storage system is remote from the first data storage system and linked to the first data storage system for transfer of remote copy data from the first data storage system to the second data storage system. The first data storage system includes a first data processor and a first non-transitory computer-readable storage medium. The second data storage system includes a second data processor and a second non-transitory computer readable storage medium. The method includes the first data processor executing a first set of computer instructions stored in the first non-transitory computer-readable storage medium, and the second data processor executing a second set of computer instructions stored in the second non-transitory computer-readable storage medium, to perform the steps of: (a) maintaining secondary storage in the second data storage system as a remote mirror of primary storage in the first data storage system as a host computer writes data to the primary storage in the first data storage system, the secondary storage being maintained in a synchronous mode in which the first data storage system returns an acknowledgement of completion of a write operation to the host computer when the second data storage system has returned an acknowledgement of receipt of remote copy data of the write operation; (b) the first data storage system performing data reduction upon the remote copy data prior to transmitting the remote copy data in a reduced form from the first data storage system to the second data storage system; and (c) the second data storage system returning the acknowledgement of receipt of the remote copy data to the first data storage system upon receipt of the remote copy data in the reduced form, and later reversing the data reduction upon the remote copy data in the reduced form to produce data written to the secondary storage to maintain the secondary storage as the remote mirror of the primary storage.

In accordance with another aspect, the present invention provides a remote mirroring system. The remote mirroring system includes a first data storage system and a second data storage system. The second data storage system is remote from the first data storage system and linked to the first data storage system for transfer of remote copy data from the first data storage system to the second data storage system. The first data storage system includes a first data processor and a first non-transitory computer-readable storage medium storing a first set of computer instructions. The second data storage system includes a second data processor and a second non-transitory computer readable storage medium storing a second set of computer instructions. The first and second sets of computer instructions, when executed by the first and second data processors, respectively, perform the steps of: (a) maintaining secondary storage in the second data storage system as a remote mirror of primary storage in the first data storage system as a host computer writes data to the primary storage in the first data storage system, the secondary storage being maintained in a synchronous mode in which the first data storage system returns an acknowledgement of completion of a write operation to the host computer when the second data storage system has returned an acknowledgement of receipt of remote copy data of the write operation; (b) the first data storage system performing data reduction upon the remote copy data prior to transmitting the remote copy data in a reduced form from the first data storage system to the second data storage system; and (c) the second data storage system returning the acknowledgement of receipt of the remote copy data to the first data storage system upon receipt of the remote copy data in the reduced form, and later reversing the data reduction upon the remote copy data in the reduced form to produce data written to the secondary storage to maintain the secondary storage as the remote mirror of the primary storage.

BRIEF DESCRIPTION OF THE DRAWINGS

Additional features and advantages of the invention will be described below with reference to the drawings, in which.

Figure 1:
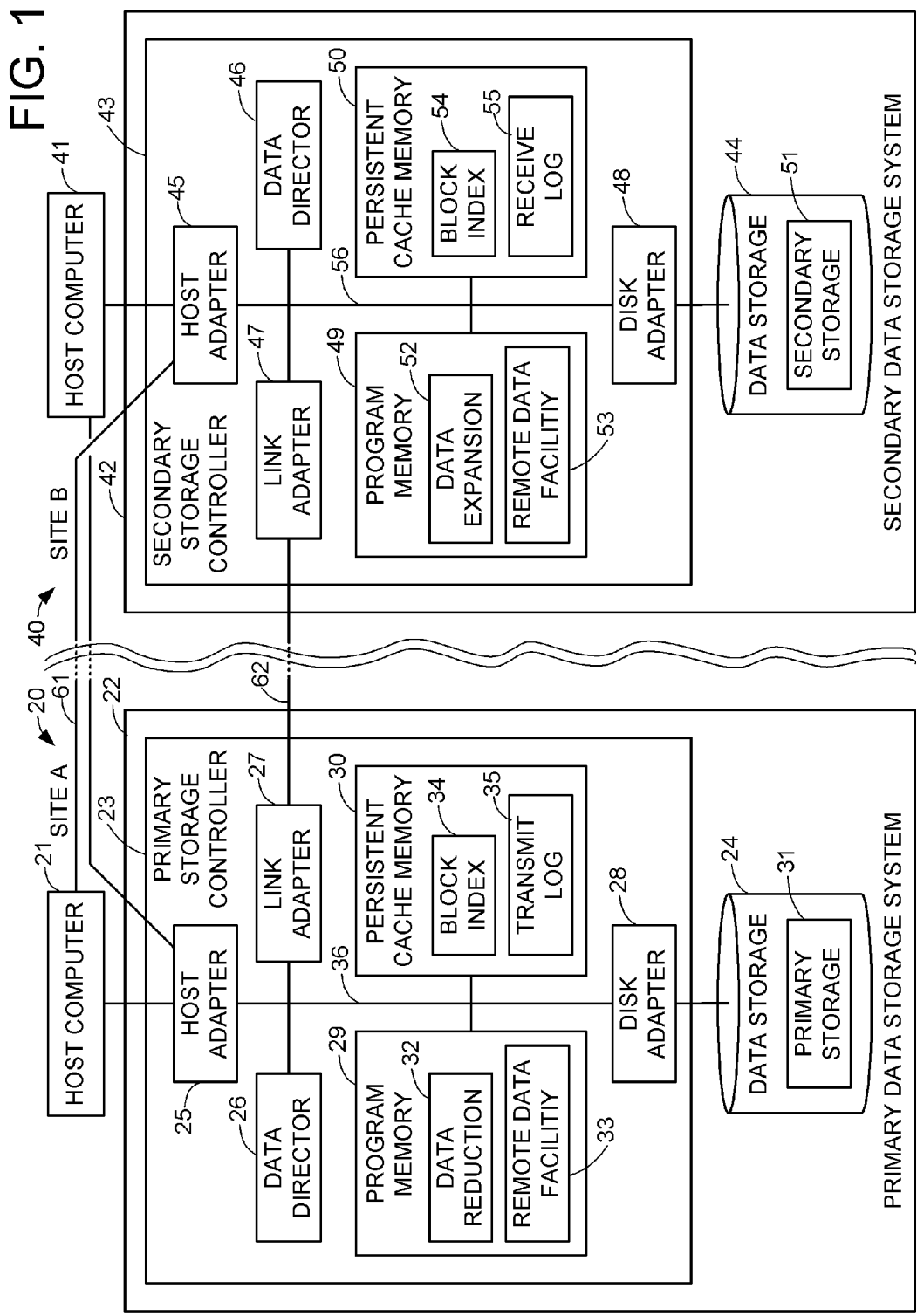
FIG. 1 is a block diagram illustrating a remote mirroring system according to the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows a remote data mirroring system including a first site 20 and a second site 40. The second site 40 is geographically remote from the first site 20. The first site 20 includes a host computer 21 and a primary data storage system 22. The second site 40 includes a secondary data storage system 42. In this context, "primary" designates the storage system that the host computer uses for read-write access under normal circumstances when the primary storage system 22 is accessible to the host computer 21 and the primary storage system 22 acknowledges completion of read-write operations requested by the host computer 21. In this context, "secondary" designates the storage system that is used for maintaining a remote backup copy that is not directly accessed by the host computer 21 under normal circumstances. The host computer 21, however, may use the secondary storage system 42 for read-write access to the remote backup copy once the host computer 21 determines that the primary storage system 22 is inaccessible or otherwise fails to acknowledge completion of read-write operations. If a disaster at the first site 20 renders the host computer 21 inoperative, then the host computer 41 at the second site 40 may access the remote backup copy to resume the data processing that was interrupted by the disaster at the first site 20.

The primary data storage system 22 includes a primary storage controller 23, which receives data from the host computer 21. The primary storage controller 23 is also coupled to data storage 24 which may include an array of data storage devices such as disk drives, optical disks, CD's, solid-state disk drives, or other data storage devices.

The primary storage controller 23 includes at least one host adapter 25 which interfaces with host computer 21. Data received from the host computer 21 is typically stored in persistent cache memory 30 before being transferred through a disk adapter 28 to the data storage 24. The cache memory 30, for example, is battery-backed dynamic random access memory. The primary storage controller 23 also includes a data director 32, which executes micro-code computer instructions in a program memory 29 to control data transfer between the host computer 21, cache memory 30, and the data storage 24. For example, the data director 32 is a general purpose digital computer data processor including one or more core central processing units (CPUs) for executing the computer program instructions stored in the program memory 29. Although the data director 32 is shown as a separate unit, either one of a host adapter 25 or disk adapter 28 may be operative as a data director, to execute computer instructions in the program memory 29 to control the operation of the primary storage controller 23.

The program memory 29 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

For remote data mirroring, the storage controller 23 has a link adapter 27 coupled to the internal bus 36 of the primary storage controller 23. The link adapter 27 is coupled, via at least one communication link 62, to a link adapter 47 on the storage controller 43 of a secondary data storage system 42. In the ideal case, the communication link 62 is a dedicated high speed, point-to-point communication link such as a fiber optic link driven by an LED driver, per IBM ESCON standard, or a fiber optic link driven by a laser driver. In other cases, the communication link uses one or more T1 or T3 telecommunication links, or network connections, such as FDDI network connections, T1 or T3 based networks, SONET networks, or Internet Protocol (IP) networks such as Ethernet or the Internet.

The secondary data storage system 42 is located at the second site 40 geographically remote from the first site. For this patent application, "geographically remote site" means not within the same building as the primary data storage system 22. There are presently known data processing systems which provide data mirroring to physically different data storage systems. The systems, however, are generally within the same building. The present invention is directed to providing complete data recovery in case of disaster, such as when a natural disaster such as a flood or a hurricane, or man made disasters such as fires or bombings destroy one physical location, such as one building.

As in the case of the primary data storage system, the secondary data storage system 42 includes, in addition to the secondary storage controller 43, data storage 44, which may include an array of storage devices such as disk drives.

The secondary storage controller 43 also includes at least a host adapter 45, which is linked to the host computer 21 at the site 20. The host adapter 45 may also receive data from the host computer 41 at the remote site 40. The secondary storage controller 43 also includes persistent cache memory 64, which receives data from the host adapter 45 and the link adapter 47, as well as a disk adapter 48 which controls writing data to and from data storage 44. Also provided is a data director 46 which controls data transfer over a communication bus 56 to which all the elements of the secondary storage controller 43 are coupled. For example, the data director 68 is a general purpose digital computer data processor including one or more core central processing units (CPUs) for executing computer program instructions stored in a program memory 49. The program memory 49 is a non-transitory computer readable storage medium, such as electrically erasable and programmable read-only memory (EEPROM).

The remote mirroring system of FIG. 1 is designed to provide the transfer of remote copy data from the primary data storage system 22 to the geographically remote secondary data storage system 42 in a fashion that is transparent to the user, and external from any influence of the primary host computer 21, which is most directly coupled to the primary data storage system 22. The remote mirroring system of FIG. 1 is also designed to operate in at least a synchronous mode wherein the primary and secondary storage systems 22, 42 guarantee that the data has been stored in the persistent memory 30, 50 before input/output completion; that is, before channel end and device end is returned to the primary host computer 21. Thus, in the synchronous mode, the primary data storage system 22 automatically controls the duplication or copying of data to the storage controller 43 of the secondary data storage system 42 in a fashion that is transparent to the primary host computer 21 while maintaining secondary storage 51 that is a mirror of primary storage 31. Only after data is safely stored in both the primary and secondary data storage systems, and safe storage of the data in the secondary storage system 42 has been indicated by receipt of an acknowledgement from the secondary storage system to the primary data storage system 22, does the primary data storage system 22 acknowledge to the primary host computer 21 that the data is synchronized. Should a disaster or facility outage occur at the primary data storage system site 20, the user will simply need to restart the interrupted transaction by accessing the secondary data storage system 42, for example, by using the host computer 41 to resume execution of a copy of the application program at the site 40 of the secondary data storage system.

The present invention more particularly concerns a method of reducing the amount of remote copy data transferred over the link 62 while synchronously maintaining secondary storage 51 that is a mirror of the primary storage 31. This is done by reducing the remote copy data stream in-band (synchronously) and journaling the received remote copy data stream in the secondary data storage system 42 so that data updates on both the primary data storage system 22 and the secondary data storage system 42 are more quickly acknowledged on both systems in order to increase system performance. Reduction of the remote copy data stream is accomplished in-band and synchronously by any method that reduces the amount of data transmitted yet is reversible later to recover the original data content. The remote data changes are applied to the secondary storage 51 by a background process on the secondary storage controller 43, well after receipt of the remote copy data has been acknowledged.

In general data reduction involves recognition of redundant data patterns in the remote copy data stream and replacement of the recognized redundant data patterns with more compact representations. Therefore, data compression and data de-duplication are examples of data reduction. For example, data-duplication is applied to the remote copy data stream by recognizing redundant copies of data blocks that have been previously transmitted from the primary data storage system 22 to the secondary data storage system 42, and replacing the redundant copies of the data blocks with pointers to the data blocks that have been previously transmitted.

In a specific implementation, as shown in FIG. 1, the program memory 29 in the primary data storage system 22 includes a remote data facility program 33 governing transmission of remote copy data from the link adapter 27 over the data link 62 to the secondary data storage system 42. The program memory 29 also includes a data reduction program 32. When a new data block is written to the primary storage 31, the remote data facility places a pointer to the new data block into the transmit log. The log entry has an initial state of "data reduction needed."

If data reduction is needed, the data reduction program 32 operates upon the new data block by searching a block index 34 to determine whether the new data block is a copy of a data block previously transmitted over the link 62 and that should reside in the secondary storage 51. If the search of the block index 34 indicates that the new data block is a copy of such a data block that should reside in the secondary storage 51, then a pointer to the previously transmitted block is placed in the entry of the transmit log. In any case, after the data reduction program has finished data reduction upon the new block, the state of the entry of the transmit log is changed to "transmission ready."

The block index 34 may have a conventional organization of a hash table of pointers to hash lists. Alternatively, the block index 34 may incorporate content-addressable memory so that the content of the block index can be searched in parallel for a copy of a data block previously transmitted over the link 62.

In the "transmission ready" state, the remote data facility 33 enables the link adapter 27 to transmit an update to the new data block from the primary data storage system 22 to the secondary data storage system 43. For example, the update to the new data block is either the new data of the new data block or a pointer to a previously transmitted data block that contains a copy of the new data of the new data block. After transmission, the state of the entry of the transmit log is changed to "update transmitted".

When the link adapter 47 of the secondary data storage system 42 receives an update for the new data block from the link adapter 27 of the primary data storage system, the link adapter 47 invokes the remote data facility program 53 in the program memory 49. The remote data facility program 53 places the received update into a corresponding entry of a receive log 55 in the persistent cache memory 50, and then causes the link adapter 47 to return an acknowledgement of receipt to the link adapter 27 in the primary data storage system 22.

Upon receipt of an acknowledgement from the link adapter 47, the remote data facility program 33 changes the state of the corresponding entry in the transmit log 35 to "update acknowledged." If the corresponding entry in the transmit log 35 is the last update for a read-write transaction, then the remote data facility program 33 checks whether there are any prior updates that have been sent over the link 62 but not yet acknowledged. If so, then the remote data facility initiates re-transmission of the prior updates, and if re-transmission does not result in the return of an acknowledgement of receipt, then the remote data facility may report a failure of the remote data mirroring system to the host computer 21. Once there are no prior updates of the pending transaction that have been sent over the link 62 but not yet acknowledged, the remote data facility 33 reports the end of the read-write transaction to the data director 26 so that the data director returns an acknowledgement of completion of the read-write transaction to the host computer 21, and then the remote data facility 33 marks the transmit log entries for the completed transaction. Finally, in a background process, the remote data facility 33 checks if each "transaction completed" log entry has a new data block, and if so, updates the block index 34 to include the new data block, and then in any case, removes the transmit log entry.

The remote data facility 53 in the secondary data storage system 43 has a background process that services the receive log 55. If an entry of the receive log includes a pointer rather than a new data block, then the remote data facility 53 invokes a data expansion program 52 to reverse any data reduction upon the updates received from the primary data storage system. For example, the data expansion program 53 uses the pointer to access a block index to find a previously transmitted data block including the new data of an update. In any case, the remote data facility writes the new data of the update to the secondary storage 51, and then updates the block index to indicate that the new data that has been written to the secondary storage 51.

Figure 2:
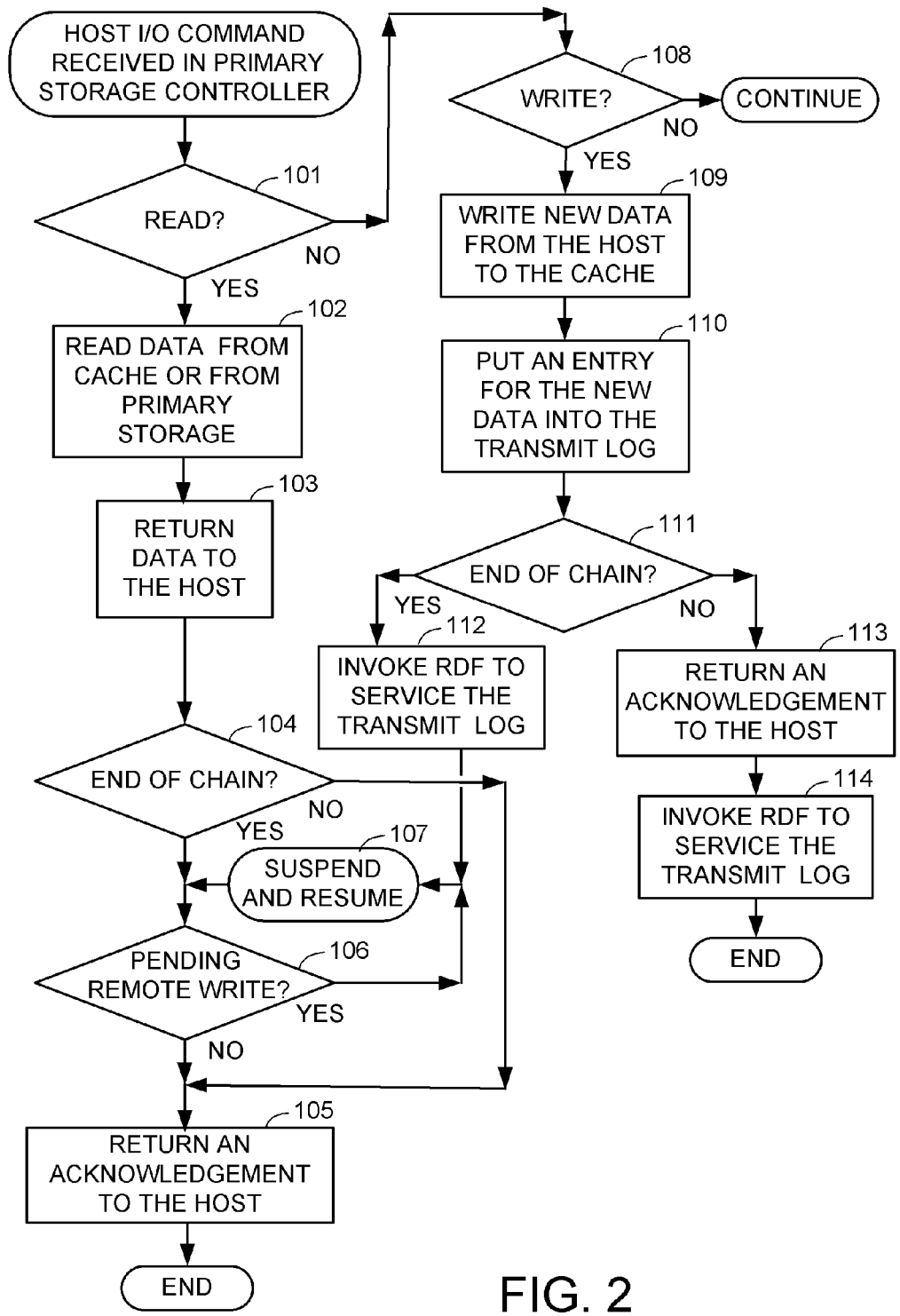
FIG. 2 is a flowchart of programming of a data director in a primary storage controller in the system of FIG. 1.

FIG. 2 shows programming of the data director (26 in FIG. 1) in the primary storage controller (23 in FIG. 1) to respond to a host I/O command received in the host adapter (25 in FIG. 1). In this example, the host I/O command is a read command or a write command, and the command may be flagged to indicate that it is the end of a chain of commands in a read-write transaction. In a first step 101, if the command is a read command, then execution branches to step 102. In step 102, the data director reads data, as requested by the host computer, from the persistent cache memory (30 in FIG. 1), or from the primary storage (31 in FIG. 1) if the requested data is not found in the persistent cache memory. Then in step 103, the data director returns the requested data to the host computer. In step 104, if the read command is not an end-of-chain command, then execution branches to step 105. In step 105, the data director returns an acknowledgement to the host computer, and processing of the read command is finished.

In step 104, if the read command is an end-of-chain command, then execution continues to step 106, In step 106, if there are any pending remote writes in the transmit log, then execution branches to step 107. In step 107, execution is suspended and resumed and loops back to step 106 until there are no pending remote writes in the transmit log. Once there are no pending remote writes in the transmit log, then execution continues from step 106 to step 105, so that an acknowledgement is returned to the host computer, and processing of the read command is finished.

In step 101, if the host I/O command is not a read command, then execution branches to step 108. If the host I/O command is a write command, then execution continues from step 108 to step 109. In step 109, the data director writes new data from the host computer to the persistent cache memory (30 in FIG. 1). Later, in a background operation, the disk adapter (28 in FIG. 1) writes the new data back to the primary storage (31 in FIG. 1). In step 110, the data director puts an entry for the new data into the transmit log (35 in FIG. 1). In step 111, if the write command is an end-of-chain command, then execution branches to step 112 to invoke the remote data facility (RDF) to service the transmit log. Execution continues from step 112 to step 107, in order to return an acknowledgement to the host computer (step 105) once there are no pending remote writes (step 106) in the transmit log.

In step 111, if the write command is not an end-of-chain command, then execution branches to step 113. In step 113, the data director returns an acknowledgement to the host computer. Then in step 114, the data director invokes the remote data facility (RDF) to service the transmit log, and processing of the write command is finished.

Figure 3:
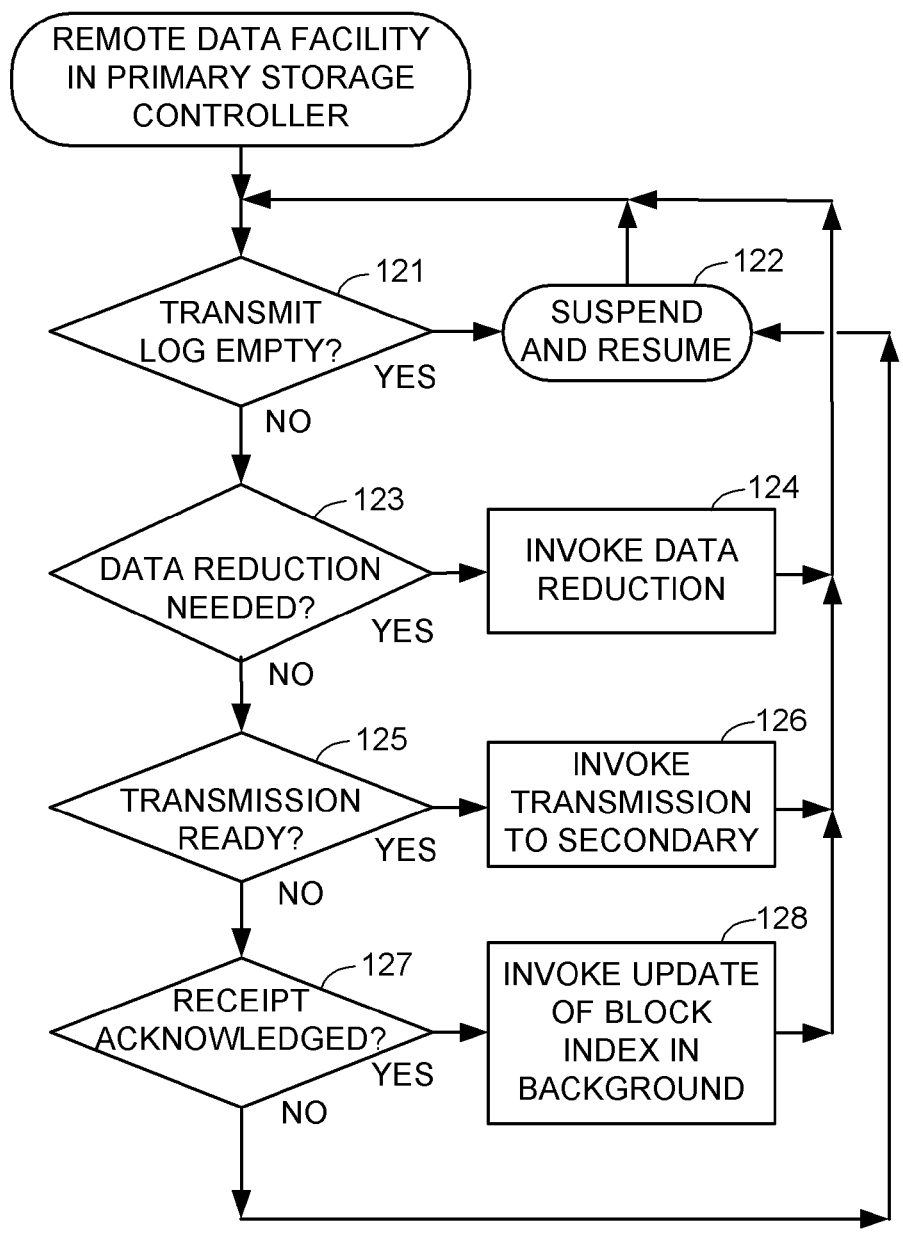
FIG. 3 is a flowchart of a remote data facility in the primary storage controller in the system of FIG. 1.

FIG. 3 shows programming of a transmit log service task in the remote data facility (33 in FIG. 1) in the primary storage controller in the remote mirroring system of FIG. 1. In a first step 121, if the transmit log is empty, then execution branches to step 122 to suspend and resume the transmit log service task. Execution loops from step 122 back to step 121, so that execution continues from step 121 to step 123 once the transmit log is no longer empty.

In step 123, if an entry in the transmit log indicates that data reduction is needed, then execution branches to step 124 to invoke the data reduction program (32 in FIG. 1), and then execution loops from step 124 back to step 121.

In step 123, if data reduction is not needed, then execution continues to step 125. In step 125, if an entry in the transmit log indicates that remote copy data is ready for transmission to the remote location, then execution branches to step 126 to invoke transmission of the remote copy data to the secondary storage controller, and then execution loops from step 126 back to step 121.

In step 125, if an entry in the transmit log does not indicate that remote copy data is ready for transmission, then execution continues to step 127. In step 127, if the entry in the transmit log indicates that receipt of the remote copy data has been acknowledged by the secondary storage controller, then execution branches to step 128, to invoke an update of the block index in background, so that the block index includes the remote data that was acknowledged by the secondary storage controller. Execution loops from step 126 back to step 121. In step 127, if the entry in the transmit log does not indicate that receipt of the remote copy data has been acknowledged, then execution loops back to step 122.

Because step 128 is performed in background, step 128 can be interrupted to service the transmit queue for invoking data reduction (in step 124) and invoking transmission to the secondary (in step 126) for a subsequent remote copy update before step 128 is completed. In this fashion, the update of the block index in step 128 does not slow down the transmission of the remote copy updates from the primary storage controller (22 in FIG. 1) to the secondary data storage controller (43 in FIG. 1). Thus, the update of the block index in step 128 does not slow down the primary storage controller (23 in FIG. 1) acknowledging completion of an I/O command chain from the host computer (21 in FIG. 1).

Figure 4:
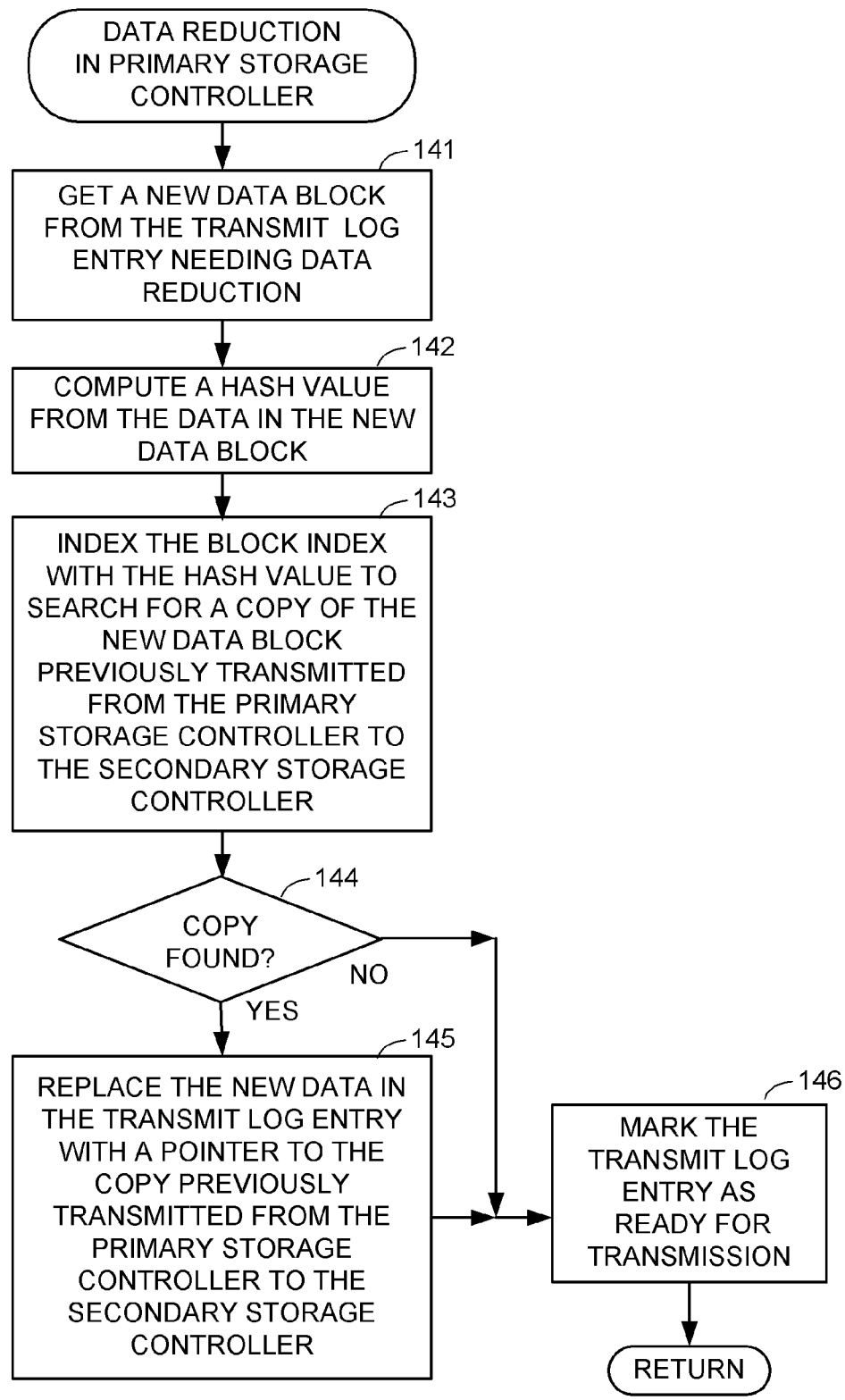
FIG. 4 is a flowchart of a data reduction program in the primary storage controller in the system of FIG. 1.

FIG. 4 shows details of the data reduction program (32 in FIG. 1) in the primary storage controller (23 in FIG. 1) in the system of FIG. 1. The data reduction program is invoked to perform data reduction upon remote copy data associated with a transmit log entry. In a first step 141, the data reduction program gets a new data block from the transmit log entry. Next, in step 142, a hash value is computed from the data in the new data block. Then, in step 143, the block index is indexed with the hash value to search for a copy of the new data block previously transmitted from the primary storage controller to the secondary storage controller. In step 144, if the search of the block index indicates that the new data block is a copy of a previously transmitted block of remote copy data, then execution continues to step 145.

In step 145, the new data in the transmit log entry is replaced with a pointer to the copy previously transmitted from the primary storage controller to the secondary storage controller. For example, if the block index indicates that only one previously transmitted copy has the same hash value as the hash value of the new block, then this hash value may serve as the pointer. In any case, the pointer to the copy previously transmitted can be the storage address of the copy that was previously transmitted.

After step 145, execution continues to step 146. Execution also continues from step 144 to step 146 if a previously transmitted copy was not found in the block index. In step 146, the data reduction program marks the transmit log entry as ready for transmission, and then execution returns.

Figure 5:
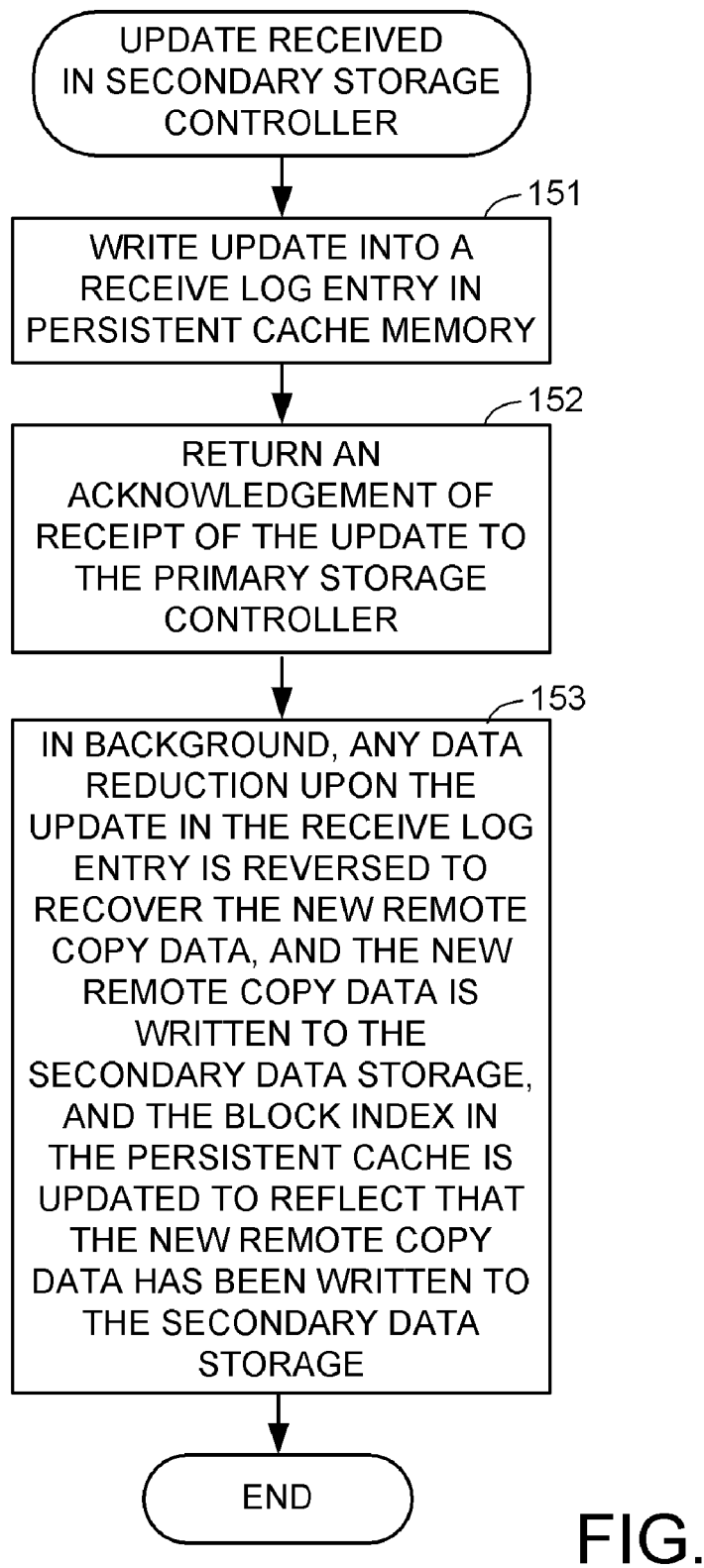
FIG. 5 is a flowchart of a remote data facility in the secondary storage controller in the system of FIG. 1.
Figure 6:
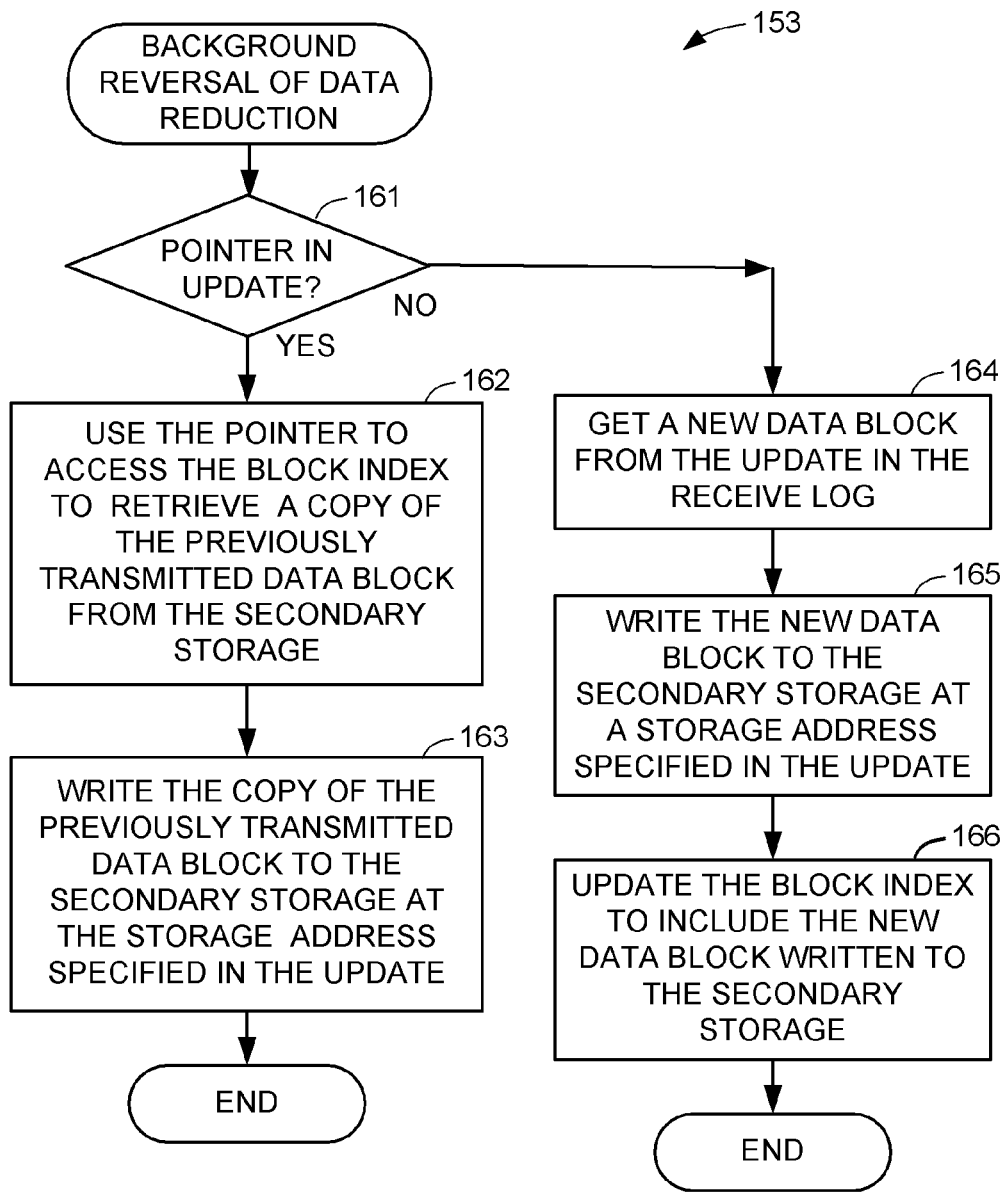
FIG. 6 is a flowchart of a background update procedure in the remote data facility in the secondary storage controller in the system of FIG. 1.

FIG. 5 shows an update task of the remote data facility (53 in FIG. 1) in the secondary storage controller (43 in FIG. 1) in the system of FIG. 1. The update task is invoked upon receipt of a remote copy update in the link adapter (47 in FIG. 1) in the secondary storage controller. In a first step 151, the update is written into an entry of the receive log (55 in FIG. 1) in the persistent cache memory (50 in FIG. 1). Next, in step 152, the update task causes the link adapter (47 in FIG. 1) in the secondary storage controller (43 in FIG. 1) to return an acknowledgement of receipt of the update to the primary storage controller (23 in FIG. 1). Then, in step 153, in background, any data reduction upon the update in the receive log entry is reversed to recover the new remote copy data, and the new remote copy data is written to the secondary data storage, and the block index in the persistent cache is updated to reflect that the new data has been written to the secondary data storage. After step 153, the update task is finished.

By performing step 153 in background, it is possible to interrupt step 153 to perform steps 151 and 152 for a following update before step 153 is completed for a previous update. In this fashion, the reversal of the data reduction to put the new remote copy data into the secondary storage (51 in FIG. 1) does not slow down the secondary storage controller (53 in FIG. 1) securing remote copy updates in the persistent cache memory (50 in FIG. 1) and returning an acknowledgement of safe receipt of the remote copy updates to the primary storage controller. Thus, the reversal of the data reduction to put the new remote copy data into the secondary storage (51 in FIG. 1) does not slow down the primary storage controller (23 in FIG. 1) returning an acknowledgement of completion of an I/O command chain to the host computer (21 in FIG. 1).

FIG. 5 shows a specific implementation of step 153 in FIG. 5. In this example, in a first step 161 of FIG. 5, if the remote copy update includes a pointer to a previously transmitted block of remote copy data instead of a new data block, then execution continues to step 162. In step 162, the pointer is used to index the block index (54 in FIG. 1) to retrieve a copy of the previously transmitted data block from the secondary storage (51 in FIG. 1). Then, in step 163, the copy of the previously transmitted data block is written back to the secondary storage at a storage address specified in the update, and the processing of the update is finished.

If the update includes a new data block instead of a pointer to a previously transmitted block, then execution branches from step 161 to step 164. In step 164, the new data block is obtained from the update in the receive log. Then, in step 165, the new data block is written to the secondary storage (51 in FIG. 1) at a storage address specified in the update in the receive log. Finally, in step 166, the block index (54 in FIG. 1) is updated to include the new data block written to the secondary storage.

In view of the above, remote copy data is reduced prior to transmission to a remote storage location so that less data is required to be transferred between a primary data storage system and a secondary data storage system and thus increasing performance in a synchronous mode of operation. The data is reduced in-band and mirrored synchronously in such a way as to guarantee data integrity, and allow acknowledgements of a successful data transfer to the remote system more rapidly, thus improving update throughput. The remote data changes are applied by a background process (well after receipt of the remote copy data has been acknowledged) on the remote data storage system, thus allowing the remote data storage system to optimize I/O of the remote copy data to the secondary storage. In a similar fashion, the data reduction process may update an index to previously transmitted remote copy data by a background process (well after receipt of the remote copy data has been acknowledged) on the primary data storage system, thus allowing reduced remote copy data to be transmitted more quickly to the secondary data storage system.

The invention claimed is:

1. A method of remote mirroring of data between a first data storage system and a second data storage system, the second data storage system being remote from the first data storage system and linked to the first data storage system for transfer of remote copy data from the first data storage system to the second data storage system, the first data storage system including a first data processor and a first non-transitory computer-readable storage medium, the second data storage system including a second data processor and a second non-transitory computer readable storage medium, said method comprising the first data processor executing a first set of computer instructions stored in the first non-transitory computer-readable storage medium, and the second data processor executing a second set of computer instructions stored in the second non-transitory computer-readable storage medium, to perform the steps of:

(a) maintaining secondary storage in the second data storage system as a remote mirror of primary storage in the first data storage system as a host computer writes data to the primary storage in the first data storage system, the secondary storage being maintained in a synchronous mode in which the first data storage system returns an acknowledgement of completion of a write operation to the host computer when the second data storage system has returned an acknowledgement of receipt of remote copy data of the write operation;

(b) the first data storage system performing data reduction upon the remote copy data prior to transmitting the remote copy data in a reduced form from the first data storage system to the second data storage system; and (c) the second data storage system returning the acknowledgement of receipt of the remote copy data to the first data storage system upon receipt of the remote copy data in the reduced form, and later reversing the data reduction upon the remote copy data in the reduced form to produce data written to the secondary storage to maintain the secondary storage as the remote mirror of the primary storage;

wherein step (b) includes performing data reduction upon the remote copy data by finding that the remote copy data includes a copy of a block of data that was previously transmitted from the first data storage system to the second data storage system, and replacing the copy of the block of data with a pointer to the block of data that was previously transmitted from the first data storage system to the second data storage system; and wherein step (b) further includes searching a block index to find that the remote copy data includes said copy of a block of data that was previously transmitted from the first data storage system to the second data storage system.

2. The method as claimed in claim 1, which further comprises the first data processor executing a background routine in the first set of computer instructions stored on the first non-transitory computer-readable storage medium to update the block index to include a new block of remote copy data upon receipt of an acknowledgement from the second data storage system that the new block of remote copy data has been received by the second data storage system.

3. The method as claimed in claim 1, wherein the first set of computer instructions includes a remote data facility program and a data reduction program, and the method includes the first data processor executing the remote data facility program to service a transmit log in persistent memory of the first data storage system, the transmit log including log entries of remote copy data of write commands from the host computer, and the first data processor executing the data reduction program to reduce the remote copy data of the log entries of remote copy data before transmission of the remote copy data of the log entries of remote copy data from the first data storage system to the second data storage system.

4. The method as claimed in claim 1, wherein the second set of computer instructions includes a remote data facility program and a data expansion program, and the method includes the second data processor executing the remote data facility program to service a receive log in persistent memory of the second data storage system, the receive log including log entries of remote copy data received from the first data storage system, and the second data processor executing the data expansion program to reverse the data reduction of the remote copy data after reception from the first data storage system.

5. A remote mirroring system comprising a first data storage system and a second data storage system, the second data storage system being remote from the first data storage system and linked to the first data storage system for transfer of remote copy data from the first data storage system to the second data storage system, the first data storage system including a first data processor and a first non-transitory computer-readable storage medium storing a first set of computer instructions, the second data storage system including a second data processor and a second non-transitory computer readable storage medium storing a second set of computer instructions, the first and second sets of computer instructions, when executed by the first and second data processors, respectively, performing the steps of:
(a) maintaining secondary storage in the second data storage system as a remote mirror of primary storage in the first data storage system as a host computer writes data to the primary storage in the first data storage system, the secondary storage being maintained in a synchronous mode in which the first data storage system returns an acknowledgement of completion of a write operation to the host computer when the second data storage system has returned an acknowledgement of receipt of remote copy data of the write operation;
(b) the first data storage system performing data reduction upon the remote copy data prior to transmitting the remote copy data in a reduced form from the first data storage system to the second data storage system; and
(c) the second data storage system returning the acknowledgement of receipt of the remote copy data to the first data storage system upon receipt of the remote copy data in the reduced form, and later reversing the data reduction upon the remote copy data in the reduced form to produce data written to the secondary storage to maintain the secondary storage as the remote mirror of the primary storage;
wherein step (b) includes performing data reduction upon the remote copy data by finding that the remote copy data includes a copy of a block of data that was previously transmitted from the first data storage system to the second data storage system, and replacing the copy of the block of data with a pointer to the block of data that was previously transmitted from the first data storage system to the second data storage system; and
wherein step (b) further includes searching a block index to find that the remote copy data includes said copy of a block of data that was previously transmitted from the first data storage system to the second data storage system.

6. The remote mirroring system as claimed in claim 5, which further comprises the first data processor executing a background routine in the first set of computer instructions stored on the first non-transitory computer-readable storage medium to update the block index to include a new block of remote copy data upon receipt of an acknowledgement from the second data storage system that the new block of remote copy data has been received by the second data storage system.

7. The remote mirroring system as claimed in claim 5, wherein the first set of computer instructions includes a remote data facility program and a data reduction program, and the remote data facility program, when executed by the first data processor, services a transmit log in persistent memory of the first data storage system, the transmit log including log entries of remote copy data of write commands from the host computer, and the data reduction program, when executed by the first data processor, reduces the remote copy data of the log entries of remote copy data before transmission of the remote copy data of the log entries of remote copy data from the first data storage system to the second data storage system.

8. The remote mirroring system as claimed in claim 5, wherein the second set of computer instructions includes a remote data facility program and a data expansion program, and the remote data facility program, when executed by the second data processor, services a receive log in persistent memory of the second data storage system, the receive log including log entries of remote copy data received from the first data storage system, and the data expansion program, when executed by the second data processor, reverses the data reduction of the remote copy data after reception from the first data storage system.

9. A method of remote mirroring of data between a first data storage system and a second data storage system, the second data storage system being remote from the first data storage system and linked to the first data storage system for transfer of remote copy data from the first data storage system to the second data storage system, the first data storage system including a first data processor and a first non-transitory computer-readable storage medium, the second data storage system including a second data processor and a second non-transitory computer readable storage medium, said method comprising the first data processor executing a first set of computer instructions stored in the first non-transitory computer-readable storage medium, and the second data processor executing a second set of computer instructions stored in the second non-transitory computer-readable storage medium, to maintain secondary storage in the second data storage system as a remote mirror of primary storage in the first data storage system as a host computer writes data to the primary storage in the first data storage system, by performing the steps of:
(a) the first data storage system receiving a write request from a host computer, the write request specifying a write operation and specifying data to be written to the primary storage, and first data storage system responding to the write request from the host computer by performing data reduction upon the specified data to produce remote copy data in a reduced form, transmitting the remote copy data in the reduced form to the second data storage system, and writing the specified data to the primary storage;

(b) the second data storage system receiving the remote copy data in the reduced form, and returning an acknowledgement of receipt of the remote copy data in the reduced form to the first data storage system upon receipt of the remote copy data in the reduced form, and later reversing the data reduction upon the remote copy data in the reduced form to produce data written to the secondary storage to maintain the secondary storage as the remote mirror of the primary storage; and (c) the first data storage system receiving the acknowledgement of receipt of the remote copy data in the reduced form from the second data storage system, and returning an acknowledgement of completion of a write operation to the host computer upon receipt of the acknowledgement of receipt of the remote copy data in the reduced form from the second data storage system;

wherein the data reduction upon the specified data to produce the remote copy data in the reduced form includes searching a block index to find that the specified data includes a copy of a block of data that was previously transmitted from the first data storage system to the second data storage system, and in response to finding that the specified data includes a copy of a block of data that was previously transmitted from the first data storage system to the second data storage system, replacing the copy of the block of data with a pointer to the block of data that was previously transmitted from the first data storage system to the second data storage system; and the reversing of the data reduction upon the remote copy data in the reduced form to produce the data written to the secondary storage to maintain the secondary storage as the remote mirror of the primary storage includes using the pointer to the block of data that was previously transmitted from the first data storage system to the second data storage system to retrieve a copy of the block of data that was previously transmitted from the first data storage system to the second data storage system.

10. The method as claimed in claim 9, which further comprises the first data processor executing a background routine in the first set of computer instructions stored on the first non-transitory computer-readable storage medium to update the block index to include a new block of remote copy data upon receipt of an acknowledgement from the second data storage system that the new block of remote copy data has been received by the second data storage system.

* * * * *